Oct. 31, 1961    L. M. COOK ET AL    3,006,486
MATERIAL HANDLING SYSTEM FOR FREIGHT VEHICLES
Filed July 21, 1959    2 Sheets-Sheet 1

United States Patent Office 3,006,486
Patented Oct. 31, 1961

3,006,486
MATERIAL HANDLING SYSTEM FOR
FREIGHT VEHICLES
Lawrence M. Cook, Hugh D. Granbery, and John R. Gruble, Dallas, Tex., and Hugh L. Jacobs, Oklahoma City, Okla., Carl N. Morgan, administrator of the estate of Hugh L. Jacobs, deceased; assignors to Socony Mobil Oil Company, Inc., a corporation of New York
Filed July 21, 1959, Ser. No. 828,500
3 Claims. (Cl. 214—75)

The present invention relates to a system for loading and unloading freight vehicles and more particularly to a system for expediting the transfer of massive and/or heavy material to and from freight vehicles and has for an object the transfer of such material between freight vehicles and load platforms of various heights.

Significant improvements have been made in the art of material handling. One such improvement has been the use of palletized loads, that is, the stacking of cartons, barrels and other containers on a pallet and the transportation of such a load through the use of fork-lift trucks and similar mechanical transportation devices. However, the efficient use of such material handling systems for use in freight vehicles such as vans requires that the height of the warehouse dock and the height of the bed of the freight vehicle must be substantially the same. Any large deviation or difference in these heights will prevent the use of such efficient handling system.

In accordance with the present invention, there is provided a system for permanent mounting on a freight vehicle which will permit the use of a palletized loading system independent of the relative levels between the vehicle bed or floor and the warehouse docks, or other terminal facilities. The present invention is useful where loading docks are unavailable, for it permits the deposition of a palletized or other type loads directly on the ground. More particularly, there is provided in combination with the body portion of a freight vehicle a material handling system which permits the movement of a palletized load from any point within the freight vehicle to a position outside the freight vehicle for deposition of the palletized load on some load receiving medium such, for example, the loading dock at a warehouse which may be at a height different from the height of the vehicle floor. The reverse procedure of loading the vehicle under similar conditions is also made possible.

In one aspect of the present invention, the system is comprised of spaced parallel tracks or rails which are mounted on supporting structure secured to and extending upwardly from the floor or load-supporting structure of the freight vehicle. A load hoisting means is mounted on movable supporting structure extending between the track and movable therealong to provide for movement of the hoisting means along the tracks. Track extensions are provided which are movable from a position within the body portion of the freight vehicle to positions outside of the body portion for providing, with the tracks, for the movement of the hoisting means, and a supported load, between positions within and without the body portion of the vehicle for loading and unloading the vehicle.

In a preferred embodiment of the present invention, the track extensions are mounted for pivotal movement about a vertical member secured to the load-supporting structures of the vehicle. Where the invention is employed on a freight van, the track extensions are movable to a position entirely within the body portion to permit the closure and locking of rear doors usually provided on such vans. In yet another aspect of the present invention, there is provided means for properly positioning the load hoisting means with respect to pallet loads in the freight vehicle preparatory to removal of the pallet load from the vehicle. More particularly, the hoisting means is movable transverse of the freight vehicle along a track structure extending between the side rails or tracks. The positioning means locates the hoisting means in a predetermined position with respect to the pallet load and in such position locks the hoisting means against movements transverse of the freight vehicle while the load is being removed from the vehicle.

For other objects and attendant advantages of the present invention, reference may be had to the following detailed description taken in conjunction with the accompanying drawings in which.

Figure 1:
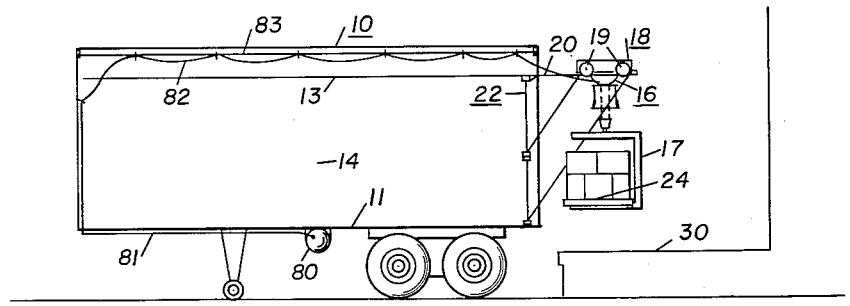
FIG. 1 is a schematic side view representation of a truck van embodying the present invention, illustrating a load in the process of being picked up at a dock for movement into the van.

Referring now to the drawings and particularly to FIG. 1, there is illustrated the body portion 10 of a freight vehicle embodying the present invention. While the invention will be described in conjunction with a particular form of freight vehicle, a truck van, and a particular type load, a palletized load, it will be understood that the material handling system may be adapted for use in other forms of freight vehicles and for other type loads and that the detailed description to follow should not be considered as a limitation upon the use of the present invention.

Figures 2, 7:
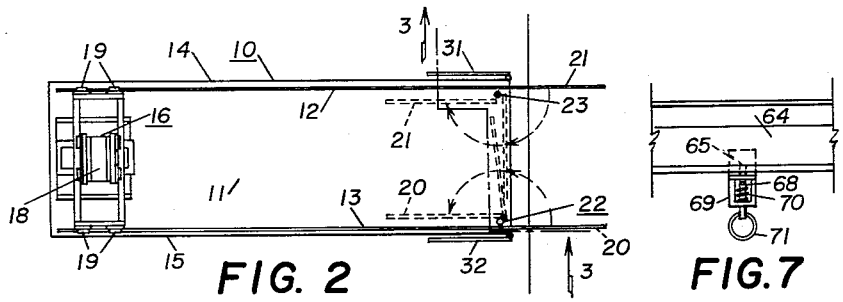
FIG. 2 is a top view of the schematic representation of FIG. 1 illustrating the palletized load of FIG. 1 within the truck van.
FIG. 7 is a view of the carriage positioning means taken along a line substantially corresponding with line 7—7 of FIG. 6.

The body portion of van 10 of the freight vehicle includes a load-supporting structure 11 which may be the bed or floor of the truck, and is provided with spaced parallel tracks 12 and 13, FIG. 2, mounted on supporting structure 14 and 15 extending upwardly from the bed or floor 11 of the truck. The supporting structure 14 and 15 may in some instances, as here, be the side wall structure of the body portion or van 10, or, if desired, the supporting structure for the tracks 12 and 13 may be provided as a structure supplemental to the side walls of the van.

The tracks 12 and 13 are supported above the level of the floor 11. Preferably, the tracks 12 and 13 are located as close to the top of the van 10 as possible in order to provide for maximum clearance and thus for capacity loading of the van. It will be understood that the specific location of the tracks with respect to their position above the floor will be dependent upon the types of load to be transported and the design of the vehicle. A load hoisting means 16 is mounted on carriage 18 for movement along the tracks 12 and 13 by way of wheels 19. A counterbalanced pallet fork hook 17 depends from the hoisting means 16 for engagement with pallet load 24.

Track extensions 20 and 21 are mounted on supporting structure 22 and 23 to provide for the movement of a load 24 from a position outside the truck, as illustrated in FIG. 1, to a position within the truck, as illustrated in FIG. 2. The location of the tracks or rails 12 and 13 above the floor or bed of the van, together with the track rail extensions 20 and 21, facilitate the movement of load from, or the positioning of the load on, a loading facility of any height, for example, the dock 30. It will be observed that the dock 30 is illustrated at an elevation substantially below the level of the floor or bed 11 of the van 10. As such it is virtually impossible to employ the palletized loading devices, for example, fork-lift trucks or pallet movers, in the movement of a load to or from the interior of the van 10. Accordingly, the present invention provides the means whereby it is now possible to take full advantage of palletized loading techniques for freight vehicles without concern for relative levels as between truck beds and docks or warehouse floors.

In many instances, the loads carried by the freight vehicle are extremely valuable, and such vehicles are normally provided with doors 31 and 32, FIG. 2, in order to completely close the van and protect the contents from tampering enroute, or from any damage which might occur to such contents upon exposure to the elements. Accordingly, in order to maintain the safeguards available by the use of doors 31 and 32, the extension rails 20 and 21 are made movable from the outer or extended position to either one of two positions within the van as illustrated by dotted lines. When the van is fully loaded, the rail extensions 20 and 21 are moved into positions just inside the rear doors. When the van is empty or partially loaded, the rails may be swung completely inside the van against the side walls of the van.

Figure 3:
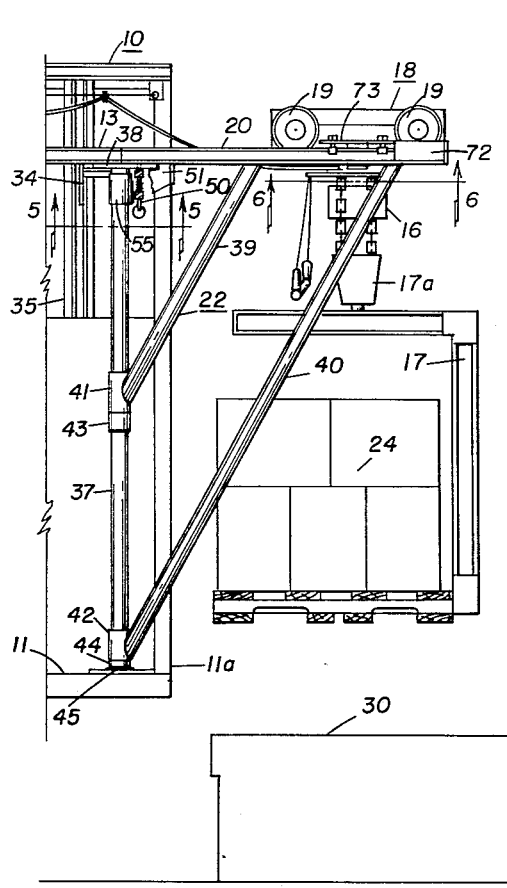
FIG. 3 is an enlarged detailed side elevation view taken along a line substantially corresponding with line 3—3 of FIG. 2 and having added the hoisting means and carriage.

As illustrated in FIG. 3, the rails or tracks, as represented by track 13, are secured to gussets 34, welded or otherwise mounted to vertical side posts 35 providing supporting structure for the tracks, and also, in this particular construction, providing the side wall supports for the van 10. The rails 12 and 13 and the extension rails 20 and 21 may be of any suitable construction. In one application of the present invention, they are of the type disclosed in U.S. Patent 1,550,142. While only one of the supporting structures for the rails and extension rails has been illustrated in FIG. 3, the description which follows of one of them will suffice for an understanding as to the construction of the other. The extension rail 20 is secured by way of supporting structure 22 to the van 10. The supporting structure comprises a vertically disposed metal stanchion 37 secured in fixed position to the body structure of the van 10. The metal stanchion, which may be a pipe or rod, is welded at its bottom end by way of plate 45 to floor structure 11 of the van. At its upper end, the stanchion 37 is secured to wall structure of the van by rail positioning plate 38. The extension rail 20 is supported by way of metallic diagonal members 39 and 40 mounted at their lower ends respectively to sleeves 41 and 42, rotatably mounted to the stanchion 37. The positions of the sleeves 41 and 42 are maintained along the stanchion 37 by way of supporting sleeves 43 and 44 welded or otherwise secured to the stanchion 37. These sleeves 43 and 44 transmit the vertical load imposed upon the rail 20 to stanchion 37 by way of diagonal members 39 and 40.

The extension side rails 20 and 21 supported in the manner above described are capable of supporting substantial loads, in the order of between one (1) and two (2) tons. The use of two parallel rails lends to the structure a stability important in providing for ease of movement of loads. It has been found that the use of such an arrangement embodying the present invention permits one man to remove a full palletized van load of sixteen (16) to twenty (20) tons from a 40-ft. van in less than 30 minutes with ease heretofore unavailable in unloading freight vans to docks having elevations different from the floor elevations of the vans.

In one embodiment of the present invention, the extension rails were each 6 feet long, extending approximately 5 feet outside the van. The length was selected for convenience of dropping a palletized load 24 on the dock 30 after clearing the edge 11a of the truck floor. It will be understood that the length of the extension track will vary from one installation to another dependent upon many factors, including the size of load and the size of the van. The vertical stanchion 37 in one embodiment was a 2-inch pipe as were the diagonal supporting arms 39 and 40. The track 20 was supported or located at a position approximately 7 feet above the floor of the van. This track location is of sufficient height for handling pallet loads averaging 4.5 feet in height. Such loads may be raised above the floor of the van and deposited on docks somewhat higher than the van floor; and of course the same loads may be lowered right to ground level.

Figure 4:
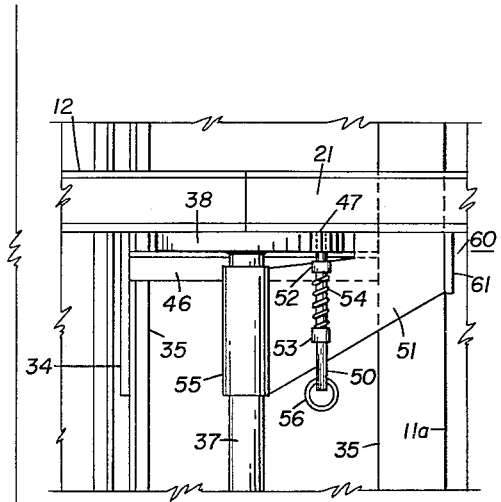
FIG. 4 is an enlarged fractional view of the track positioning mechanism.
Figure 5:
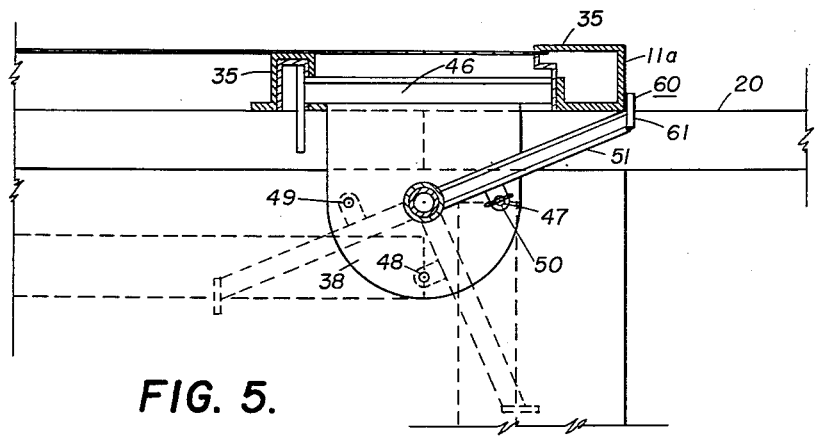
FIG. 5 is another view of the track positioning mechanism taken along a line substantially corresponding with line 5—5 of FIG. 3.

Each of the extension rails or tracks 20 and 21 is automatically positioned in any way of three locations by means including the rail-positioning plate 38. Details of one of the rail positioning arrangements are illustrated in FIGS. 4 and 5, wherein the plate 38 is shown secured at its upper portion to the under side of side rail 12 as by welding. The under side of plate 38 is mounted at its lower surface to the rail supporting structure of the van. More particularly the lower surface of the plate 38 is welded to a cross member 46, which in turn is secured at opposite ends to sideposts 35 of the van 10. As above described, the upper end of the stanchion 37 is welded to the under side of the plate 38 to provide with the plate a rigid supporting means for and about which the extension rail 21 may be rotated.

The plate 38 is provided with a plurality of pin receiving means shown as holes in at least the bottom surfaces of the plate 38 and which may extend entirely through the plate. In the preferred embodiment the plate 38 is provided with at least three holes 47, 48, and 49, FIG. 5, for receiving a pin 50 to automatically position and to lock the extension side rail 21 in any one of the three positions. The pin 50 is mounted on a plate 51 by way of guides 52 and 53. A spring 54 normally urges the pin 50 upwardly into engagement with any one of the holes 47–49. The plate 51 is fixed at one end to the under side of the rail 21 and at an opposite end fixed to a sleeve 55 which is rotatable about the stanchion or pipe 37. The side rail 21 is manually rotated about the pipe 37 by urging the pin 50 downwardly against the force of spring 54 by aid of the ring 56 in order to release the extension rail assembly for movement about the pipe 37.

The positioning of the pin 50 in selected ones of the holes 47–49 automatically locates and locks the extension rail in any one of three desired positions: (a) outside the van for loading and unloading operations; (b) in position just inside the rear doors of the van; (c) adjacent the walls of the van when the van is empty or partially loaded. Thus, with the pin 50 positioned in hole 47, the extension rail 21 is locked and properly positioned for loading and unloading operations; with the pin 50 in hole 48, the extension rail 21 is properly positioned and locked in overlapping relation with the other rail 20, FIG. 2; and with the pin in hole 49, the extension rail 21 is locked in position adjacent the side wall of the van.

With the extension rails 20 and 21 in a loading and unloading position, FIG. 2, considerable force is applied to further separate the rails when the carriage 18 is moved out upon the rails and particularly when the carriage is supporting the load 24. In order to relieve the strain upon the rail positioning and locking pin 50, a limiting arrangement 60 is provided, FIGS. 4 and 5, comprised of plate 61 which engages the end 11a of the van. This arrangement provides a positive stop which prevents further outward movement of the rail 21 and substantially relieves force from the pin 50. The plate 61 is shown mounted to the end of plate 51 and at the under side of the rail 21. The mounting may be by way of welding operations.

Figure 6:
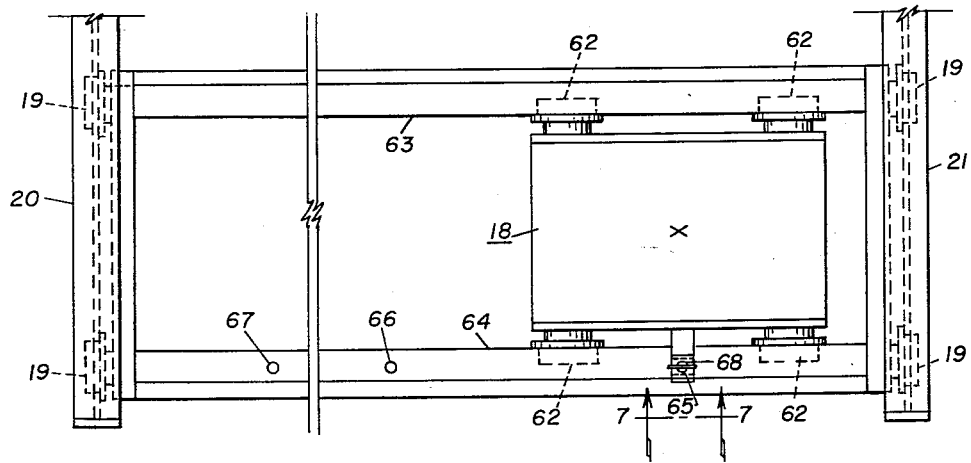
FIG. 6 is a view of the hoisting carriage taken along a line substantially corresponding with line 6—6 of FIG. 3 and illustrating details of the carriage positioning means.

In the palletized loading of vans it has been found convenient to locate at least two pallets, one adjacent the other, across the width of the van. Accordingly, the hoisting or lifting means 16 is made movable as shown in detail in FIG. 6 in a direction transverse of the supporting rails 20 and 21. Details of the hoisting means 16 have been omitted in FIG. 6 in order to simplify the illustration. The center of the hoisting means is, however, indicated by the cross mark X. The carriage 18 is supported by wheels 62 on parallel tracks 63 and 64 extending in fixed spaced relation between the wheels 19. The hoisting arrangement is provided with means automatically to position the pallet hook or fork 17, when such is employed, at the center of the pallet load situated within the van 10. More particularly the bottom portion of the cross-rail 64 is provided with a plurality of apertures or holes 65–67 which receive a spring-pressed positioning pin 68 for the proper location of the hoisting means with respect to the pallet load. With the hoisting means properly located and locked with respect to the pallet load, it is possible for an operator to move the load from a position within the truck to a position outside the truck without contact of the pallet load with the wall structure of the van. This is significant particularly where the van is parked on an incline transverse of the van.

The pin 68, FIG. 7, is mounted on a bracket 69 secured to carriage 18. A spring 70 normally urges the pin 68 into engagement with one of the holes 65–67. The pin 68 is released from hole 65 to permit relocation of carriage 18 along tracks 63 and 64 by urging downwardly on ring 71 against the force of spring 70.

The carriage manually is moved either to the left or to the right, depending upon which side of the van the operator is to begin the unloading operation. When the carriage is in a position centered to locate the hoisting means with respect to one of the pallets the pin 68 will drop into a related locating hole, for example the hole 65. The pallet may now be engaged, lifted from the floor of the van and moved with ease to positions outside of the van without contact of the load with side wall structure of the van despite a transverse incline in the floor of the van.

The travel of the carriage 18 along the extension side rails 20 and 21 is limited by an end stop structure, FIG. 3, comprising a stop 72 mounted at the end of each rail and a stop engaging plate 73 fixed to the structure of the hoisting means assembly.

The load raising and lowering mechanism employed with the present invention may be of any desired type or form. Preferably, the counterbalanced pallet fork hook 17 is used and is attached to the hoisting means 16 as by way of chain and hook assembly 17a.

Likewise, the hoisting means used with the present invention may be of any desired design with any selected energy source for raising and lowering the load. It has been found convenient where the invention is installed on vans to make use of the compressed air energy available on such vehicles. Accordingly, the lifting mechanism for hoisting means 16 may be an air-operated hoist of the type available from any number of sources and well known in the art. The air supply for the hoisting means 16 may be provided from a supply tank 80, FIG. 1, mounted to the under side structure of the van. The tank is connected to the hoist 16 by way of a pipe or hose 81 and a flexible hose 82 supported along a cable 83 secured to suitable structure within the van 10.

Now that the principles of the invention have been explained and one embodiment thereof fully described, it will be understood that modifications may be made and certain parts may be used in place of other parts all within the scope of the appended claims.

What is claimed is:

1. The combination with the body portion of a trailer van having a load supporting platform of a system for loading and unloading the van comprising spaced parallel side tracks extending substantially the entire length of the body portion of the van, supporting structure for said tracks provided by side walls of the van extending upwardly from the load supporting platform, said side tracks being positioned substantially above said load supporting platform, load hoisting means, means extending between said tracks and movable therealong for supporting said hoisting means for movement along said side tracks, track extensions for providing a continuation of said side tracks for movement of said hoisting means to a position entirely outside the van, means for mounting said track extensions comprising a pair of vertical members mounted on said load supporting platform and extending upwardly therefrom, said extension tracks being rotatably mounted one to each of said vertical members for movement about the vertical axis of each member through an arc of at least 180°, and locking means for maintaining said extension tracks selectively in any one of three positions which positions comprise a first position wherein said extension tracks are within the van and substantially parallel with said side walls and to said side tracks, a second position wherein said extension tracks are in overlapping relation across the back of the van and substantially perpendicular to the side walls, and a third position wherein said extension tracks provide a continuation of said side tracks beyond the end of the van for loading and unloading the van.

2. The combination with the body portion of a freight vehicle having means for completely enclosing the body portion, said means including a load supporting platform, a roof, four vertical defining means, one of said vertical defining means being door means adapted for opening to the full width of said body portion, a system for loading and unloading said body portion comprising parallel tracks mounted in the upper portion of said body portion, adjacent to the vertical defining means and perpendicular to the door means, hoisting means, means extending between said parallel tracks and movable therealong for supporting said hoisting means for movement parallel to and transverse to said parallel tracks, said hoisting means thereby being adapted to operate over substantially any point within said body portion, means for extending said parallel tracks outside of said body portion, thereby enabling said hoisting means to operate over an area beyond the rear end of the body portion, comprising track members individually and rotatably mounted on vertical supports situated wholly within said body, said vertical supports each having a bearing means located adjacent to the load supporting platform with a diagonal brace running from said bearing means to a point adjacent the outermost end of the extension track, the extension track members being of a length smaller than the width of said body portion are thereby adapted to being folded to a position wholly within the body portion thereby enabling the door means to be fully closed.

3. The combination of claim 2, in which the rotatably mounted track extensions have locking means for maintaining said rotatable track extensions in any one of two positions; a first position wherein said rotatable track extensions are wholly within the van, and a second position wherein said extension tracks provide a continuation of said parallel tracks beyond the end of the body portion for loading and unloading the vehicle.

References Cited in the file of this patent

UNITED STATES PATENTS

| | | |
|---|---|---|
| 562,381 | Edwards | June 23, 1896 |
| 1,694,084 | Straight | Dec. 4, 1928 |
| 1,830,874 | Hendrickson | Nov. 10, 1931 |
| 2,088,122 | Taylor | July 27, 1937 |
| 2,442,549 | Pearlman | June 1, 1948 |
| 2,635,771 | Black | Apr. 21, 1953 |
| 2,778,512 | Stroma | Jan. 22, 1957 |
| 2,797,826 | Kuhlenschmidt | July 2, 1957 |
| 2,828,876 | Parnie | Apr. 1, 1958 |